US00RE35588E

United States Patent [19]

Gornati et al.

[11] E Patent Number: Re. 35,588

[45] Reissued Date of Patent: Aug. 19, 1997

[54] BROAD OPERATIONAL RANGE, AUTOMATIC DEVICE FOR THE CHANGE OF FREQUENCY IN THE HORIZONTAL DEFLECTION OF MULTI-SYNCHRONIZATION MONITORS

[75] Inventors: Silvano Gornati, Casorezzo; Mauro Merlo, Torre d'Isola; Maurizio Zuffada; Loic Lietar, both of Milan, all of Italy

[73] Assignee: SGS-Thomson Microelectronics S.r.L., Milan, Italy

[21] Appl. No.: 296,205

[22] Filed: Aug. 25, 1994

Related U.S. Patent Documents

Reissue of:

[64] Patent No.: 5,142,204
Issued: Aug. 25, 1992
Appl. No.: 713,691
Filed: Jun. 11, 1991

[30] Foreign Application Priority Data

Jun. 27, 1990 [IT] Italy ..... 20784/90

[51] Int. Cl.[6] ..... H01J 29/70; H01J 29/72

[52] U.S. Cl. ..... 315/364

[58] Field of Search ..... 315/364; 348/513, 348/514; 455/260

[56] References Cited

U.S. PATENT DOCUMENTS

| | | |
|---|---|---|
| 3,753,142 | 8/1973 | Nardin et al. . |
| 4,143,328 | 3/1979 | Kurita et al. . |
| 4,242,639 | 12/1980 | Boone . |
| 4,399,459 | 8/1983 | Mulvanny et al. . |
| 4,462,110 | 7/1984 | Baldwin et al. . |
| 4,577,163 | 3/1986 | Culp . |
| 4,617,520 | 10/1986 | Levine . |
| 4,680,780 | 7/1987 | Agoston et al. . |
| 4,689,582 | 8/1987 | Balaban et al. . |
| 4,791,386 | 12/1988 | Shiga . |
| 4,820,993 | 4/1989 | Cohen et al. . |
| 4,827,341 | 5/1989 | Akimoto et al. . |
| 4,916,403 | 4/1990 | Sudoh et al. . |
| 4,965,533 | 10/1990 | Gilmore . |
| 5,043,813 | 8/1991 | Christopher . |
| 5,111,151 | 5/1992 | Ii . |
| 5,193,103 | 3/1993 | Singh et al. . |

FOREIGN PATENT DOCUMENTS

| | | |
|---|---|---|
| 463418 | 1/1992 | European Pat. Off. . |
| 2141003 | 5/1984 | United Kingdom . |

OTHER PUBLICATIONS

Best, Phase-Locked Loops (1984), pp. 87–110.

Lindsay et al., "A Survey of Digital Phase-Locked Loops", IEEE Proceedings vol. 6, No. 4, Apr. 1981, pp. 410–431.

*Primary Examiner*—Theodore M. Blum

*Attorney, Agent, or Firm*—Theodore E. Galanthay; Lisa K. Jorgenson

[57] ABSTRACT

A broad operational range, automatic device for the change of frequency in the horizontal deflection of multi-synchronization monitors comprises an integrated circuit incorporating, a frequency meter being input and analog synchronization signal.

a phase comparator having two inputs and in turn receiving said synchronization signal on one input, a voltage-controlled oscillator adapted to output a signal whose frequency is depending on said voltage and operatively linked to an output of said phase comparator, and a counter connected with its input, on the one side, to the oscillator output, and on the other side, to the meter output, said counter having an output connected to the other input of the phase comparator also forming the integrated circuit output.

17 Claims, 2 Drawing Sheets

BROAD OPERATIONAL RANGE, AUTOMATIC DEVICE FOR THE CHANGE OF FREQUENCY IN THE HORIZONTAL DEFLECTION OF MULTI-SYNCHRONIZATION MONITORS

Matter enclosed in heavy brackets [ ] appears in the original patent but forms no part of this reissue specification; matter printed in italics indicates the additions made by reissue.

This invention relates to a broad operational range, automatic device for the change of frequency in the horizontal deflection of multi-synchronization monitors.

As it is known, the equipment and monitor apparatus market underwent drastic changes in recent years, especially in the sector of personal computers.

In fact, technological developments have led the manufacturers to break every now and then into the market with some new graphic standards directed to improve the picture quality ever more, both in respect of word processing and the CAD/CAM (Computer Aided Design/Computer Aided Manufacturing) functions.

This continued development involves, however, recurrent changes in the working frequencies of the above-mentioned monitors having regard to the horizontal and vertical deflection features of the picture-defining electron beam.

It will be appreciated that such continued changes are bound to add considerably to the video equipment manufacturer's efforts to follow the market trend. In fact, due to monitors being equpped with deflection circuits which operate at a pre-determined synchronization frequency, a monitor is rendered useless if that frequency is changed.

Accordingly, there exists a demand from manufacturers for deflection circuits capable of operating on a plurality of synchronization frequencies. But no integrated component has been available on the market heretofore which could meet such a demand.

The prior art merely provides deflection circuits comprised of discrete components, which have the obvious disadvantage of occupying a large circuit area and, therefore, burdening the monitor circuitry. In addition, such discrete components carry high prices which are not always matched by their performance.

The underlying technical problem of this invention is to provide an automatic device for frequency changes in the horizontal deflection of multi-synchronization monitors, which has such structural and functional features as to enable continuous synchronization through a broad frequency range, e.g. between 10 kHz and 100 kHz, while ensuring excellent performance anywhere within this utilization range.

This problem is solved by an automatic device of the type as previously indicated being characterized in that it comprises an integrated circuit incorporating,

- a frequency meter receiving a synchronization signal on its input;
- a phase comparator having two inputs, and in turn receiving said synchronization signal on one input;
- a voltage-controlled oscillator adapted to output a signal having its frequency depending on said voltage and being linked operatively to an output of said phase comparator;
- a counter connected with its input to the oscillator output, on the one side, and on the other side to the meter output, said counter having an output connected to the other input of the phase comparator and forming the integrated circuit output as well.

The features and advantages of a device according to the invention will become apparent from the following detailed description of an embodiment thereof, given by way of illustration and not of limitation with reference to the accompanying drawings.

Figure 1:
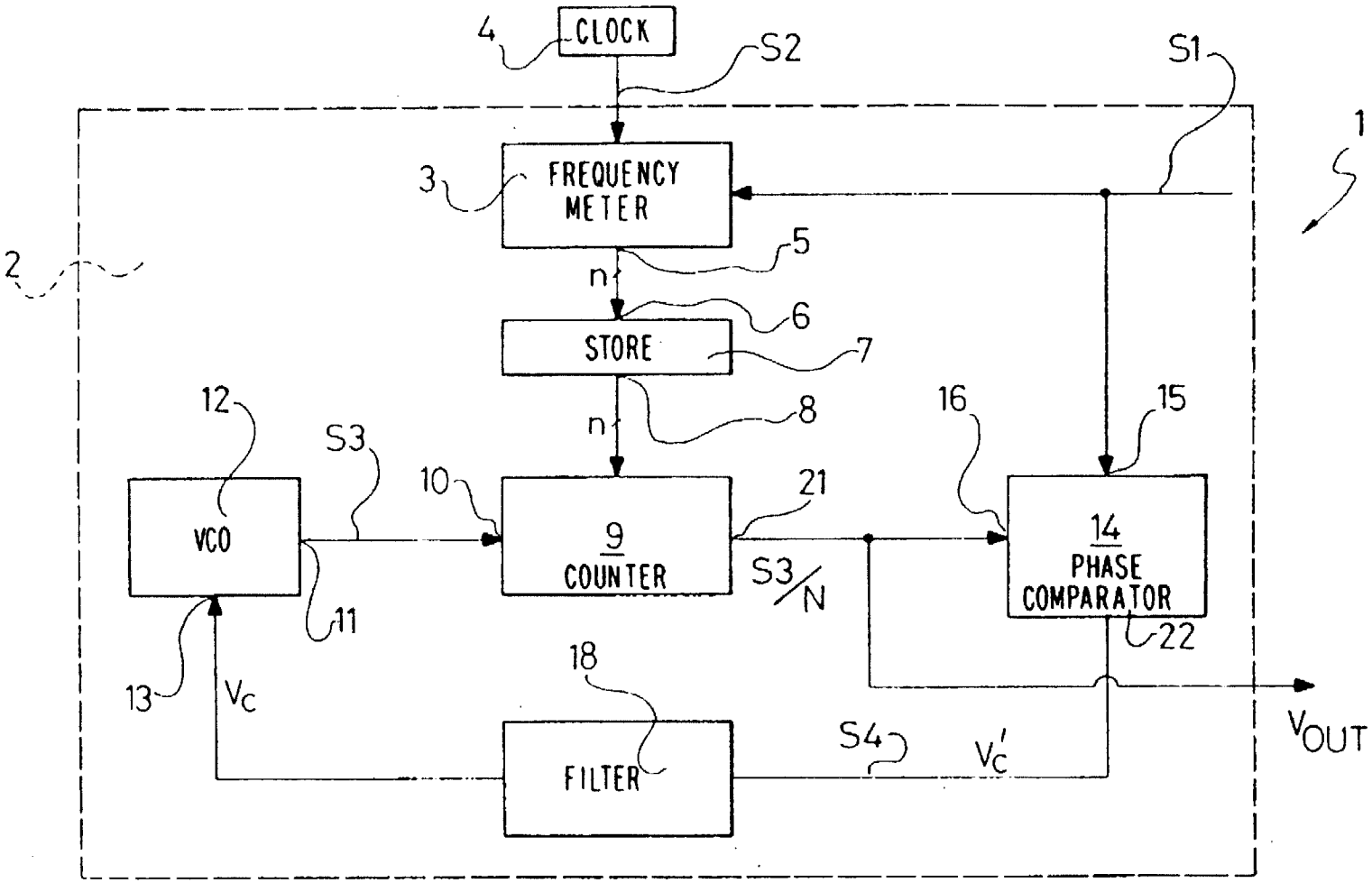
FIG. 1 is a block diagram of the device according to this invention.

With reference to the drawing figures, generally and schematically shown at 1 is an automatic device for enabling the frequency fh in the horizontal deflection of multi-synchronization monitors, not shown because conventional, to be changed.

The device 1 is particularly, but not exclusively, intended for operation within a broad range of frequencies extending from 10 kHz to 100 kHz.

This device 1 comprises an integrated circuit 2 incorporating a circuit portion 3 which is comprised of a frequency meter receiving a synchronization signal S1 at the frequency fh on one input.

The meter 3 receives, on another input, a clock signal S2 derived, for example, from a high-accuracy crystal oscillator 4 outside the circuit 2.

The meter 3 has a plurality n of outputs 5, each connected to a corresponding input 6 of a storage block 7 adapted to store the binary (n-bit) coding of signal S1 frequency value ph.

The storage block 7, in turn, comprises a plurality n of outputs, shown at 8, which are connected to the input side of a counter 9.

The counter 9 has an input 10 which receives a clock signal S3 supplied from the output 11 of a voltage-controlled oscillator VCO.

The oscillation frequency of that device 12 is depending on the value of a control voltage Vc applied to an input 13.

The structure of the integrated circuit 2 further comprises a phase comparator 14 which receives the signal S1 on one input 15. Another input 16 of that comparator 14 is directly connected to an output 21 of the counter 9 which is also a signal output for the circuit 2, producing a voltage value Vout plotted on curve 19 in FIG. 2.

The phase comparator 14 produces, on an output 22, a Vc voltage signal S4 which is applied to the control input 13 of oscillator 12 through a filter 18 adapted to reduce the ripple present on the Vc voltage signal.

The operation of the automatic device according to the invention will be now described with reference to a starting condition with the analog synchronization signal S1, having a frequency fh in the 10 to 100 kHz range, input to the frequency meter 3.

Using the clock signal S2, the meter 3 takes a measurement of the frequency of the analog signal S1, while also performing an analog-to-digital conversion whereby the binary coding N for the value of the frequency fh is presented on the n inputs of the memory 7.

Based on such coding and the value of signal S3 supplied by the oscillator 12, the counter 9 outputs an analog signal whose frequency is the same as that of signal S3 divided by the value N.

This device 1 can effect a so-called latching of the frequency to the variation of signal S1.

In this respect, it is a peculiar feature of this invention that the value of the control voltage Vc of the oscillator 12 is only stable with the signals S1 and S3/N, on the inputs 15 and 16 of the phase comparator 14, at the same frequency.

Figure 2:
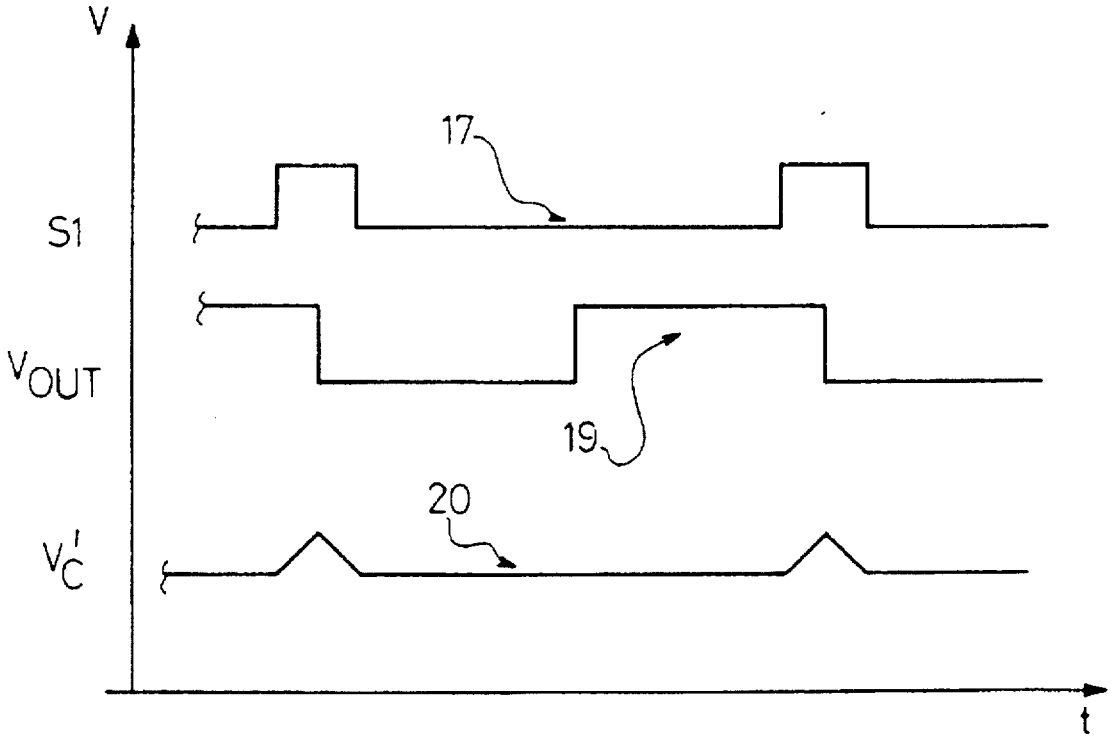
FIG. 2 is a diagramatic representation of waveforms of signals appearing in the device of FIG. 1.

With said signals under such a condition, as respectively illustrated by the waveforms 17 and 19 in FIG. 2, it is customarily recognized that they are in quadrature and such as to generate on the comparator 14 output a voltage Vc' the continuous component whereof is stable over time as illustrated by curve 20.

Under any other conditions with the value of the frequency fh other than the value of the frequency of signal S3/N, the continuous component of voltage Vc' is unstable and the device unable to operate in a stationary condition. Consequently, the value of the control voltage Vc of oscillator 12 will also be unstable.

The unstable condition of that control voltage brings about a continued variation in the frequency of signal S3, until said frequency will coincide with the value fh of the input signal S1.

The frequency meter 3 is able to measure the value of pf with an approximation of plus/minus 1%. Thus, if the frequency fh undergoes a variation below this small range, the meter 3 may be unable to detect such a variation. In that event, however, the value of the coding N stored in block 7 would still remain unchanged, and the oscillator 12 would alter the value of its own operating frequency so as to allow fh to be latched.

It may be appreciated from the foregoing description that the device 1 of this invention allows of automatic tuning of the oscillator 12 within a broad range of frequencies fh of the input signal S1. This is ensured by that the counter 9, as suitably programmed, makes the frequencies of the oscillator 12 comparable to those of the input synchronizations ph.

The integrated circuit embodying this invention has shown to be peculiarly fast in effecting the frequency latch, thereby greatly enhancing the performances of discrete components made in accordance with the prior art.

Another major advantage of such an integrated circuit is that the oscillator incorporated thereto will operate at a frequency which is much higher than the frequency of the synchronization signal, which keeps the frequency value stable over time, additionally to providing very high performance levels.

Further advantages come from the cost reduction afforded by such a circuit and the ability to accommodate the frequency range of all the current graphic standards for multi-synchronization monitors.

We claim:

1. A broad operational range, automatic device for the change of frequency in the horizontal deflection of multi-synchronization monitors, characterized in that it comprises an integrated circuit incorporating, a frequency meter receiving an analog synchronization signal on one input;

a phase comparator having two inputs and in turn receiving said synchronization signal on one input;

a voltage-controlled oscillator adapted to output a signal having its frequency depending on said voltage and being linked operatively to an output of said phase comparator;

a counter connected with its input to the oscillator output, on the one side, and on the other side to the meter output, said counter having an output connected to the other input of the phase comparator and forming the integrated circuit output as well.

2. A device according to claim 1, characterized in that, within said circuit, the meter has a plurality of n outputs, each connected to a corresponding input of a storage block adapted to store the binary coding of the frequency value of the synchronization signal.

3. A device according to claim 2, characterized in that said storage block has n outputs connected to corresponding inputs of said counter.

4. A device according to claim 1, characterized in that, connected between the output of the phase comparator and the input of the voltage-controlled oscillator, is a filter for reducing the oscillation of the voltage signal output by the comparator.

5. A device according to claim 1, characterized in that said counter is adapted to effect a division of the output signal from the oscillator by the value N of the binary coding of said frequency of the synchronization signal.

*6. A device for tracking the frequency of an input signal, comprising:*

*a frequency meter, connected to receive an input signal and produce a digital output corresponding thereto;*

*a controllable oscillator configured to synthesize a periodic signal at a frequency which is dependent on a control signal applied thereto;*

*a programmable dividing circuit, operatively connected to receive said digital output of said frequency meter, and said synthesized periodic signal, and to divide down said synthesized periodic signal by a factor determined by said digital output, and to provide an output accordingly;*

*a phase comparator configured to receive, and to detect the phase relationship between, said output of said dividing circuit and said input signal, and accordingly to produce said control signal;*

*whereby, when the frequency of said input signal changes, the value of said digital output changes, and therefore said dividing circuit provides inputs of random phase to said phase comparator, so that the frequency of said periodic signal varies in an unstable fashion until said oscillator returns to a locked relation with said input signal; whereby a return to synchronization is achieved more rapidly when said input signal shifts between frequencies.*

*7. The device of claim 6, wherein the output of said dividing circuit is connected to provide an external output.*

*8. The device of claim 6, wherein said dividing circuit comprises a counter.*

*9. The device of claim 6, wherein said frequency meter performs a direct frequency measurement.*

*10. The device of claim 6, wherein said controllable oscillator is a voltage-controlled oscillator.*

*11. A circuit comprising;*

*a phase-locked loop, operatively connected to receive an input signal and to provide a stabilized output signal accordingly;*

*a measurement stage, operatively connected to receive said input signal, and configured to provide a corresponding measurement value; and*

*a divider interposed in said phase-locked loop, and operatively connected to be controlled by said measurement value.*

*12. The circuit of claim 11, wherein said divider comprises a counter.*

*13. The circuit of claim 11, wherein said measurement stage performs a direct frequency measurement.*

*14. The circuit of claim 11, wherein said phase-locked loop comprises a voltage-controlled oscillator.*

*15. The circuit of claim 11, wherein said phase-locked loop comprises a voltage-controlled oscillator and a phase comparator, and said divider is connected between an output of said voltage-controlled oscillator and an input of said phase comparator.*

*16. A method for tracking the horizontal frequency of a video signal, comprising the steps of:*

*monitoring, and repeatedly deriving a digital value corresponding to, the frequency of an input signal;*

*synthesizing a periodic signal in a controllable oscillator in accordance with a control signal applied thereto;*

*dividing said periodic signal by said digital value, to produce a divided-down synthetic signal; and*

*detecting phase differences between said divided-down synthetic signal and said input signal, to produce a control signal which is operatively connected to control the frequency of said periodic signal generated by said controllable oscillator;*

*whereby, when the frequency of said input signal changes, said digital value changes, and therefore said dividing step provides inputs of random phase to said step of detecting phase error, so that the frequency of said periodic signal varies in an unstable fashion until said synthesizing step returns to phase lock with said input signal.*

*17. The method of claim 16, wherein said divided-down synthetic signal is connected to provide an external output.*

* * * * *